(No Model.) 2 Sheets—Sheet 1.
R. A. ANTHONY & W. H. LEWIS.
PHOTOGRAPHIC CAMERA.
No. 349,133. Patented Sept. 14, 1886.
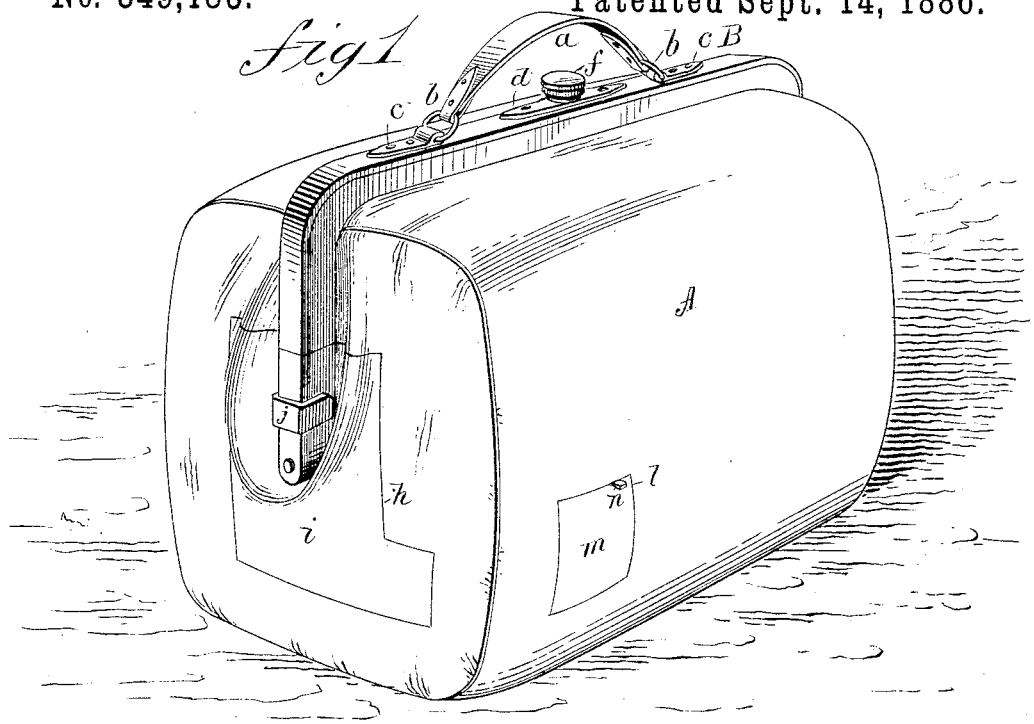
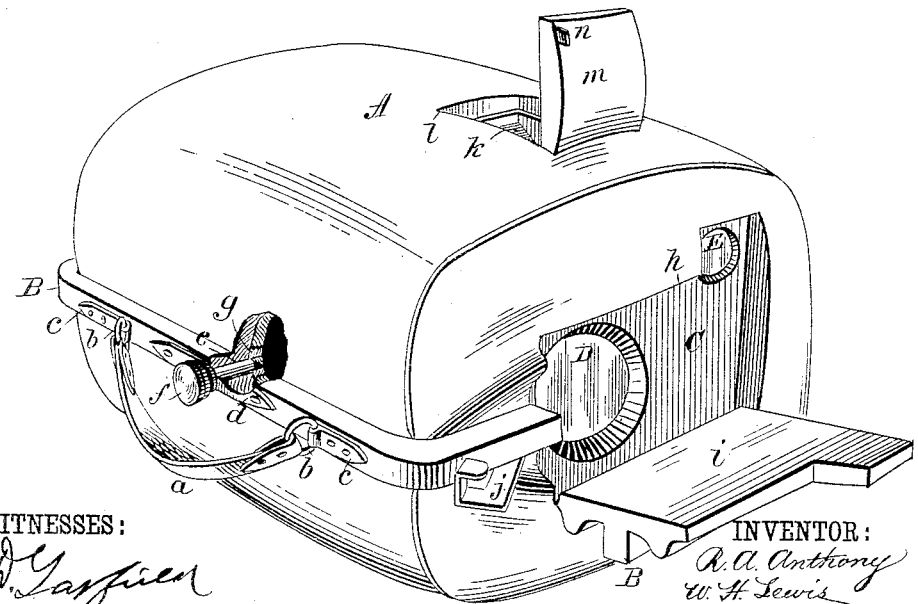
WITNESSES:
J. D. Garfield
C. Sedgwick
INVENTOR:
R. A. Anthony
W. H. Lewis
BY Munn & Co
ATTORNEYS.
N. PETERS. Photo-Lithographer, Washington, D. C.

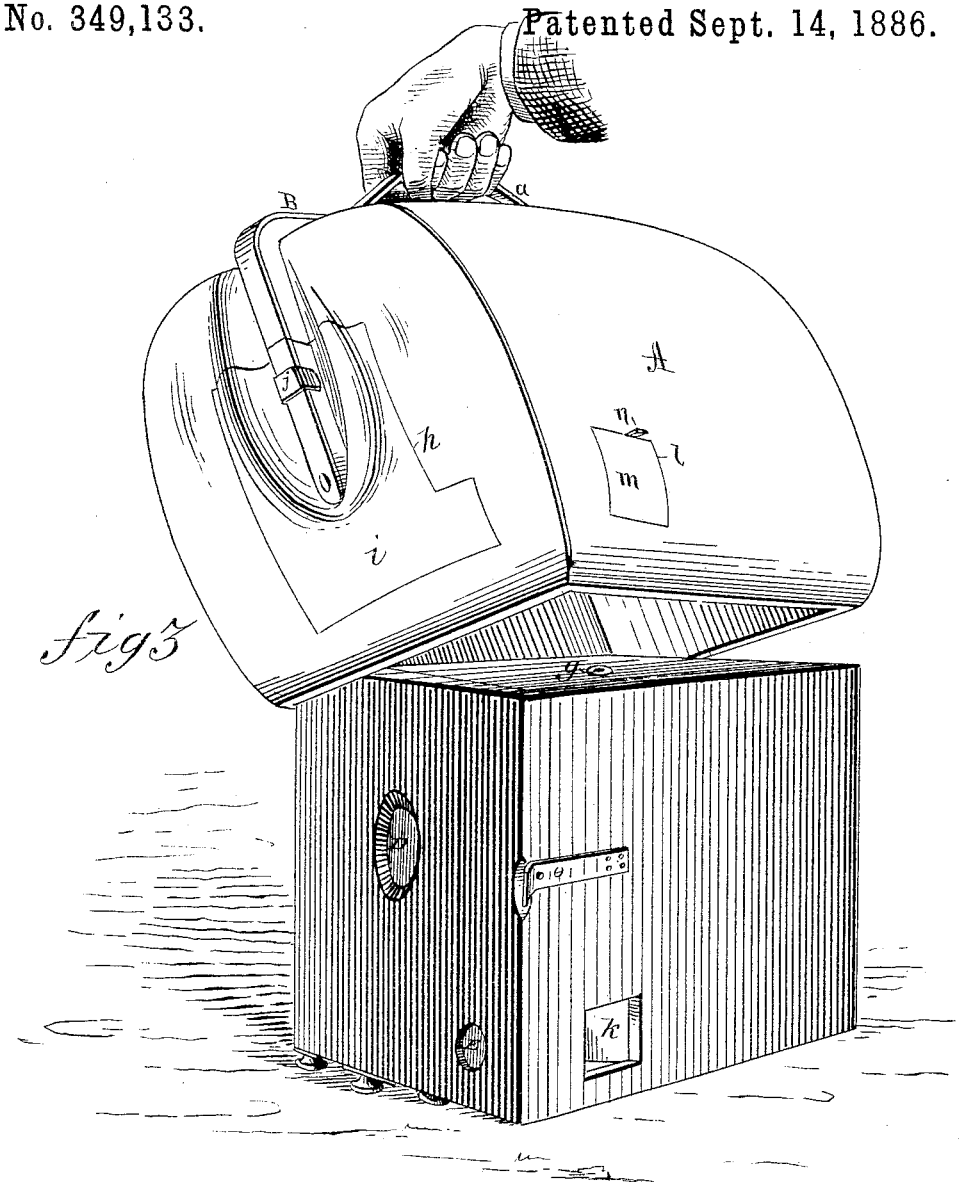

UNITED STATES PATENT OFFICE.

RICHARD A. ANTHONY AND WILLIAM H. LEWIS, OF NEW YORK, N. Y., ASSIGNORS TO E. & H. T. ANTHONY & CO., OF SAME PLACE.

PHOTOGRAPHIC CAMERA.

SPECIFICATION forming part of Letters Patent No. 349,133, dated September 14, 1886.

Application filed October 20, 1885. Serial No. 180,423. (No model.)

*To all whom it may concern:*

Be it known that we, RICHARD A. ANTHONY and WILLIAM H. LEWIS, both of the city, county, and State of New York, have invented a new and Improved Photographic Camera, of which the following is a full, clear, and exact description.

Reference is to be had to the accompanying drawings, forming part of this specification, in which similar letters of reference indicate corresponding parts in all the figures.

Figure 1 is a perspective view of our improved photographic camera, with the apertures of the carrying-case closed. Fig. 2 is a perspective view of the photographic camera, showing the apertures of the case open with the camera in position for use, part of the case being broken away to more clearly show the construction. Fig. 3 shows the camera and the carrying-case separated.

Our invention relates to photographic cameras; and it consists in a case in the form of a hand-bag or satchel, for containing, covering, and concealing a photographic camera; also, in apertures for the finder and camera-tube, these apertures being provided with doors, forming, when closed, parts of the walls of the case, and conforming to the general character of the case, so that they will not be observable.

The body of the carrying-case is formed of a box, A, which is open at the bottom, and is covered over its sides, ends, and top with leather, or cloth, or other material—such as is used in the manufacture of hand-bags—or with an imitation of such material. A median rib, B, extends along the top and down the ends of the box A, in the position usually occupied by the frame of a hand-bag, to strengthen and stiffen the box.

The rib B is made to imitate the frame of a hand-bag, and is provided with a flexible handle, *a*, attached by its ends to the rib B by means of the rings *b* and straps *c*.

Under the handle *a*, and midway between its points of attachment to the rib B, a centrally-apertured plate, *d*, is secured to the rib B, by means of screws or otherwise, and an aperture, *e*, corresponding with the aperture of the plate *d*, is formed in the center of the rib B. A screw, *f*, having a milled head, is inserted in the aperture of the plate *d* and of the rib B, and screwed into a nut, *g*, fastened into the side of the camera C. The screw *f* and plate *d* occupy the place of and imitate the ordinary satchel-lock.

The camera C, which may be of ordinary construction, nearly fills the case, sufficient space being left between the edges of the case at the open side to contain the various keys and levers employed in the operation of the camera.

In one end of the case, opposite the camera-tube D and finder-lens E, is formed an aperture, *h*, through which light is admitted to the camera. The aperture *h* is closed by a well-fitted door, *i*, carrying a portion of the rib B, which is cut away and attached to the door.

The door when closed completes the case at the end, and a clasp, *j*, such as is commonly used for fastening the frame of a satchel, is employed to hold the door *i* closed, the clasp being pivoted to the fixed part of the rib B, and embracing the part of the rib carried by the door.

In the side of the case opposite the reflector *k*, of the finder of the camera, is formed an aperture, *l*, which is closed by a hinged door, *m*, which fits the aperture and closes flush with the side of the case, of which it forms a part when closed. The door *m* is provided with a small loop, *n*, by which it may be opened.

A clasp similar to the clasp *j* is placed over the rib B at the end of the case remote from the door *i*.

When it is desired to use the camera detached from the case, the camera may be unfastened by unscrewing the screw *f*.

The case is designed to closely imitate a hand-bag or satchel, so that the user thereof may carry and use the camera contained therein without being noticed.

When the carrying-case is used merely for carrying and concealing the camera, the apertures *h l* and the doors *i m*, belonging thereto, may be omitted.

It is obvious that instead of providing a removable camera-box containing the tube and operative parts of the camera, we may arrange these parts directly in the carrying-case.

Having thus described our invention, what we claim as new, and desire to secure by Letters Patent, is—

1. In a photographic camera, a case having an aperture in the end thereof, and provided with a door closing into the aperture flush with the end of the case, and a median rib extending over the top of the case and down its ends, as herein specified.

2. In a photographic camera, a case of hand-bag form having side and end apertures, and doors closing into the apertures flush with the sides of the case, a median rib made in imitation of a hand-bag frame and extending over the top and down the ends of the case, and a handle secured to the median rib at the top of the case, as herein specified.

3. In a photographic camera, the combination, with a case open at the bottom and having a median rib along the top and down the ends, of a fastening device for retaining a camera-box within the case, as herein specified.

4. The combination, with the camera-box, of a case of hand-bag form, open at the bottom, and provided with end and side apertures, with doors fitted thereto, and a fastener for retaining the camera-box in the case, substantially as described.

5. In a photographic camera, the combination, with the inclosing and carrying case provided with a median rib and having an end aperture and a door fitted thereto, of a clasp pivoted to the fixed part of the median rib, and adapted to embrace the movable part of the median rib carried by the door, substantially as described.

6. In a photographic camera, the combination of the case of hand-bag form, provided with end and side apertures, and doors fitted to shut into the said apertures flush with the outer surface of the case, means for retaining the doors closed, a handle attached to the top of case, and a fastener for securing the camera-box in the carrying-case, substantially as described.

7. In a photographic camera, the combination, with the case of hand-bag form and camera-box fitted thereto, of a screw passing through the case and entering the camera-box for securing the case in the camera-box, as herein specified.

8. The combination, with the case formed of a box, A, open at the bottom, and provided with a median rib, B, of a handle, a, attached to the median rib, and a fastening device for retaining a camera-box in the case, as herein specified.

RICHARD A. ANTHONY.
WILLIAM H. LEWIS.

Witnesses:
EDWARD M. CLARK,
E. V. SKINNER.